Feb. 17, 1931.  P. DRYON  1,792,576
APPARATUS FOR MANIPULATING PLATE GLASS AND SIMILAR MATERIALS
Filed Dec. 3, 1928  2 Sheets-Sheet 1

Inventor,
Paul Dryon,
By Emil Bonnelycke Atty.

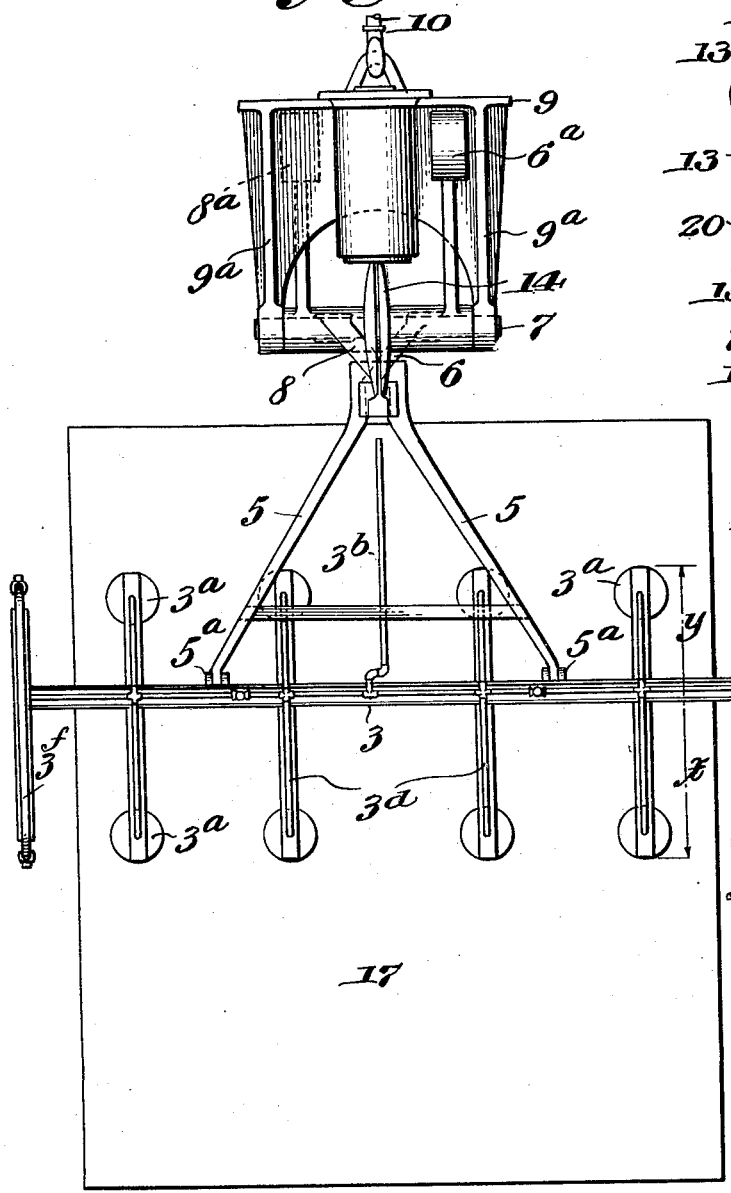
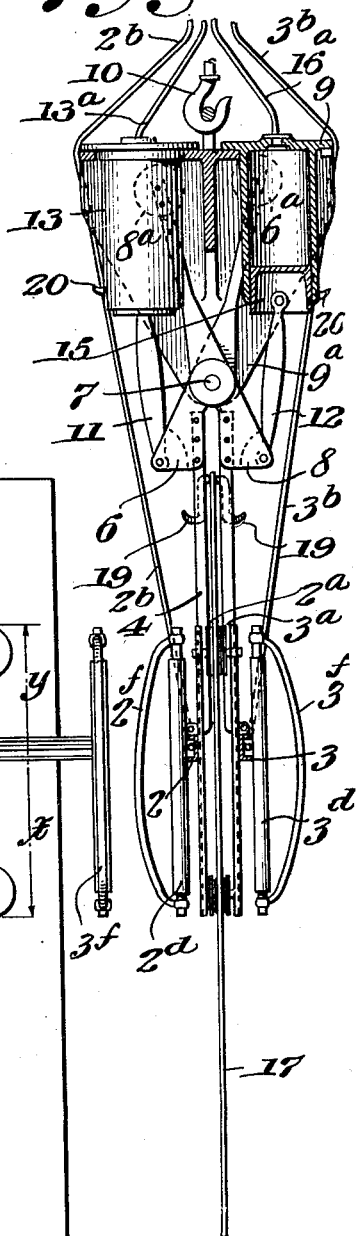

Patented Feb. 17, 1931

1,792,576

UNITED STATES PATENT OFFICE

PAUL DRYON, OF AUVELAIS, BELGIUM

APPARATUS FOR MANIPULATING PLATE GLASS AND SIMILAR MATERIALS

Application filed December 3, 1928, Serial No. 323,362, and in Belgium October 24, 1928.

The present invention relates to an apparatus for manipulating plate glass and similar materials, in which the plates of glass are lifted by means of suckers carried by a frame which can be displaced by means of a travelling crane.

The object of the invention is to construct a simple apparatus which can both transport and turn over the glass plates, this apparatus being easily adapted to any travelling crane and capable of use in the workshops where the finishing is done on platforms, as well as in those where the finishing is done on tables which are themselves subjected to a continuous movement of displacement. The apparatus according to this invention can be used with particular advantage in the latter case, since the time for the transport of the glass plates from one line of tables to the other and for turning them over is rather short, owing to the relatively great speed of movement of the tables.

The apparatus according to this invention comprises two frames which can be displaced separately and be brought in contact with the glass plates on both sides of the latter.

Each frame can pivot on the end of arms carried by a fitting suspended from a hook of the travelling crane, said frames being preferably provided with handles to allow them to be guided during their displacement.

The invention also provides that said arms may pivot with respect to the fitting suspended from the hook of the travelling crane; and it further provides that said arms be balanced on their pivots by means of counterweights, of which the position can be regulated.

The pivoting of said arms may be effected by means of a motor, and according to one form of construction, this motor consists of a piston which may be displaced in a cylinder, when a vacuum is created at one end of the latter, said piston being attached to said arms by means of a connecting rod.

Other details and features of the invention are set forth in the description of the annexed drawings which represent, as an example only, one form of construction of the invention.

Fig. 3 is a view at right angles to Fig. 2.

Fig. 4 is a diagrammatic view of an installation for the transportation and turning over of the glass plates, in the case where the latter are treated on two rows of tables.

Figure 1:
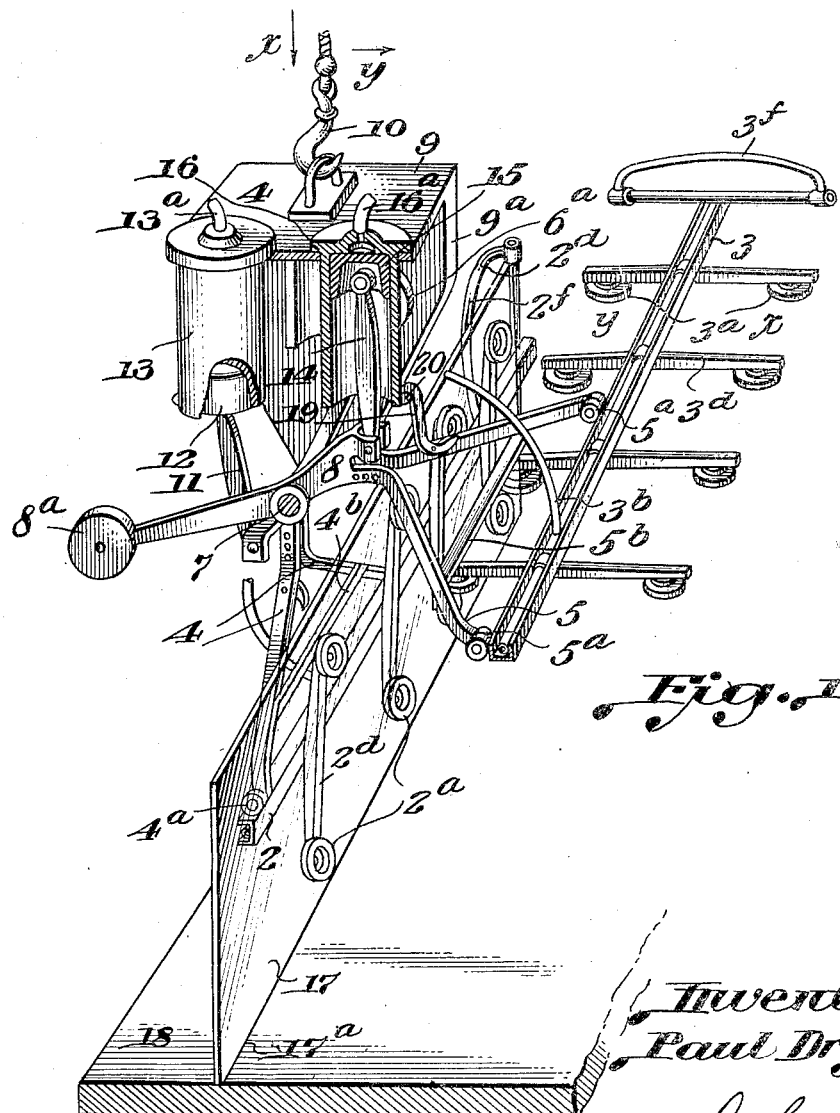
Fig. 1 is a perspective view of an apparatus according to this invention, in which one of the sucker-carrying frames is held in raised, empty position, the other frame carrying a plate or sheet of glass.

The apparatus shown in Fig. 1 consists of two frames 2 and 3, of which the suckers $2a$ and $3a$ are connected in a known manner to an exhauster, not shown, by means of the flexible tubes $2b$ and $3b$. These frames are carried by arms 4 and 5, respectively, through pivots $4a$ and $5a$.

The sucker carriers $2d$ and $3d$ are divided by the frame 2 or 3 in two lengths $x$ and $y$ so that $x$ is greater than $y$.

In this fashion, the suckers of one frame are opposite those of the other, when these frames are in their position of stable equilibrium.

To prevent these frames from turning completely over, the invention further provides that the arms 4 and 5 are fitted with stops against which certain sucker carriers can rest. In the case shown, these stops consist of the cross bars $4b$ and $5b$ which serve at the same time to strengthen the arms 4 and 5.

The arms 4 are carried by a lever 6 which rocks or swings around a pivot 7, while the arms 5 are carried by a lever 8 which pivots on the same pivot 7. This pivot 7 is carried by the cheeks $9a$ of a fitting 9, suspended from the hook 10 of a travelling crane, not shown.

The levers 6 and 8 carry respectively the counterweights $6a$ and $8a$, which can occupy different positions. The arms 4 and 5 carried, respectively, by these levers are caused to swing around the pivot 7 by means of a motor; this movement being effected, for example, in the following manner:

With the lever 6 a connecting rod 11 is connected, jointed to a piston 12 moving in a cylinder 13, while connected to the lever 8 is a connecting rod 14 jointed to a piston 15 moving in a cylinder 16. The two cylinders 13 and 16 are firmly fixed to the fitting 9. They are connected to the exhauster mentioned above by means of the flexible tubes 13a and 16a, and, together with their respective pistons and associated parts, they jointly constitute the motor above referred to.

The tubes 2b and 3b, 13a and 16a may be united to the same machine controlled by the workman on the travelling crane, so that a vacuum may be created in all the suckers of one frame, or in all the suckers of both frames, in one of the cylinders 13 or 16.

When the glass plate 17 is suspended by the frame 2 as shown in Fig. 1, the fitting 9 can pivot with respect to the point of suspension of the hook 10. Moreover, frame 2 can pivot on the pivots 4a. The frame 3 remains suspended because a vacuum is formed in the cylinder 16.

On starting from the position shown in Fig. 1, and if it is desired to place the glass plate 17, suspended by the suckers 2a, onto a table 18, the whole apparatus is allowed to descend in the direction of the arrow X, while the travelling crane is displaced at a suitable speed in the direction of arrow Y.

The frame 2 pivots with the glass plate 17 round the edge 17a of the latter, and by which it rests on the table 18. Two workmen facilitate this pivotal movement by means of the handles as 2f (similar handles 3f are provided for the frame 3).

When the glass plate rests on the table 18, air is allowed to enter the suckers 2a. The apparatus can then be displaced to take up a new plate of glass.

If, instead of placing the plate of glass 17 directly on the table 18, it has first to be turned over, said plate is first lifted slightly from table or it is placed beside the table. Then the frame 3 is lowered by allowing the air to enter the cylinder 16 above the piston 15, so that the suckers 3a fix themselves on the side of the plate 17 opposite to that on which are fixed the suckers 2a of frame 2.

Since the arms 4 and 5 of the frames 2 and 3 turn on the same pivot 7, the frames 2 and 3 exert equal pressure on the glass plate 17, if the position of the counterweights 6a and 8a has been suitably arranged.

Figure 2:
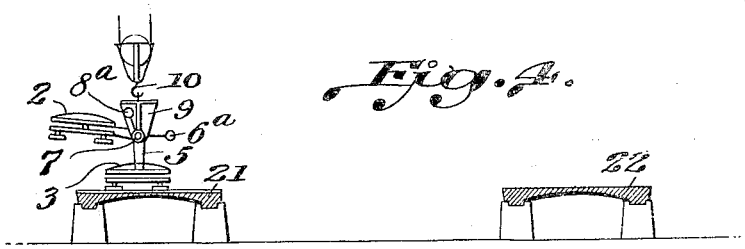
Fig. 2 is a view in elevation, with parts in section and broken away, of an apparatus in which the two sucker-carrying frames are disposed at opposite sides of a plate of glass.

The apparatus is then in the position shown in Fig. 2. When the frame 3 rests firmly against the glass 17, a vacuum is created in the suckers 3a, and then air is allowed to enter the suckers 2a. Then a vacuum is created in the cylinder 13 above the piston 12, which causes the frame 2 to pivot in a clockwise direction.

The glass plate is thus suspended by the frame 3 which assumes, in respect to the vertical plane passing through the pivot 7, a symmetrical position to that shown in Fig. 1 for the frame 2.

The invention provides further a safety device to sustain in a raised position, the frame not then in use in suspending the glass plate. This device may consist, for instance, of a hook 19 jointed to the arm 5 and arranged to hook on to a projection 20 on the fitting 9. This device, which may be released by any suitable means, holds up the frame to which it is attached, even in case air should accidentally enter the cylinder of which the piston regulates the position of the frame.

In the case where the glass plates are attached to two rows of tables moving in opposite directions (Fig. 4), when one side of the glass plates is finished, for instance in the row 21, they have to be turned over and transported to the row 22, where the other side is treated. With an apparatus according to this invention, this operation can be very easily and rapidly performed, with the minimum of danger for the workmen and the minimum of breakage for the glass plates.

It is evident that the invention is not exclusively limited to the precise construction shown, but that alterations may be made in the shape, the arrangement and the constitution of its component parts, without exceeding the scope of the invention as claimed. Especially, the driving system for pivoting the arms which support the frames, may be operated in any convenient manner, for instance, by an electric motor or even by hand power.

What I claim is:

1. An apparatus for transporting and turning over glass plates and similar materials, comprising suckers for supporting the plates, two correlated frames carrying the suckers, a single fitting common to both frames for supporting them, and means for displacing the two frames separately and for bringing them into contact with the plates on both sides of the latter.

2. An apparatus for transporting and turning over glass plates and similar materials, comprising suckers for supporting the plates, two correlated frames carrying the suckers, pivots around which said frames can be turned, a fitting adapted to be suspended from the hook of a traveling crane and provided with pivots, arms carrying the pivots of the frames and pivoting around the pivots carried by said fitting, and a balance weight of variable position on the said arms for counterbalancing, about the pivots of said fitting, the weight of said arms and of the frame they support.

3. An apparatus for transporting and turning over glass plates and similar materials, comprising suckers for supporting the plates, two correlated frames carrying the suckers, pivots around which said frames can be turned, a fitting adapted to be suspended from the hook of a traveling crane and provided with pivots, arms carrying the pivots of the frames and pivoting around the pivots carried by said fitting, and a motor for turning each of the said arms around the pivots of the said fitting.

4. An apparatus according to claim 3, in which the motor operates by difference of pressure.

5. An apparatus for transporting and turning over glass plates and similar materials, comprising suckers for supporting the plates, two correlated frames carrying the suckers, pivots around which said frames can be turned, a fitting adapted to be suspended from the hook of a traveling crane and provided with pivots, arms carrying the pivots of the frames and pivoting around the pivots carried by said fitting, a connecting rod connected to said arms, a piston connected to said rod, a cylinder wherein said piston is arranged, and a tube for exhausting the air in the cylinder.

6. An apparatus for transporting and turning over glass plates and similar materials, comprising suckers for supporting the plates, two correlated frames carrying the suckers, pivots around which said frames can be turned, a fitting adapted to be suspended from the hook of a traveling crane, a pivot carried by said fitting, and arms carrying the pivots of the frames and turning around the pivot carried by said fitting.

In testimony whereof I affix my signature.

PAUL DRYON.